UNITED STATES PATENT OFFICE.

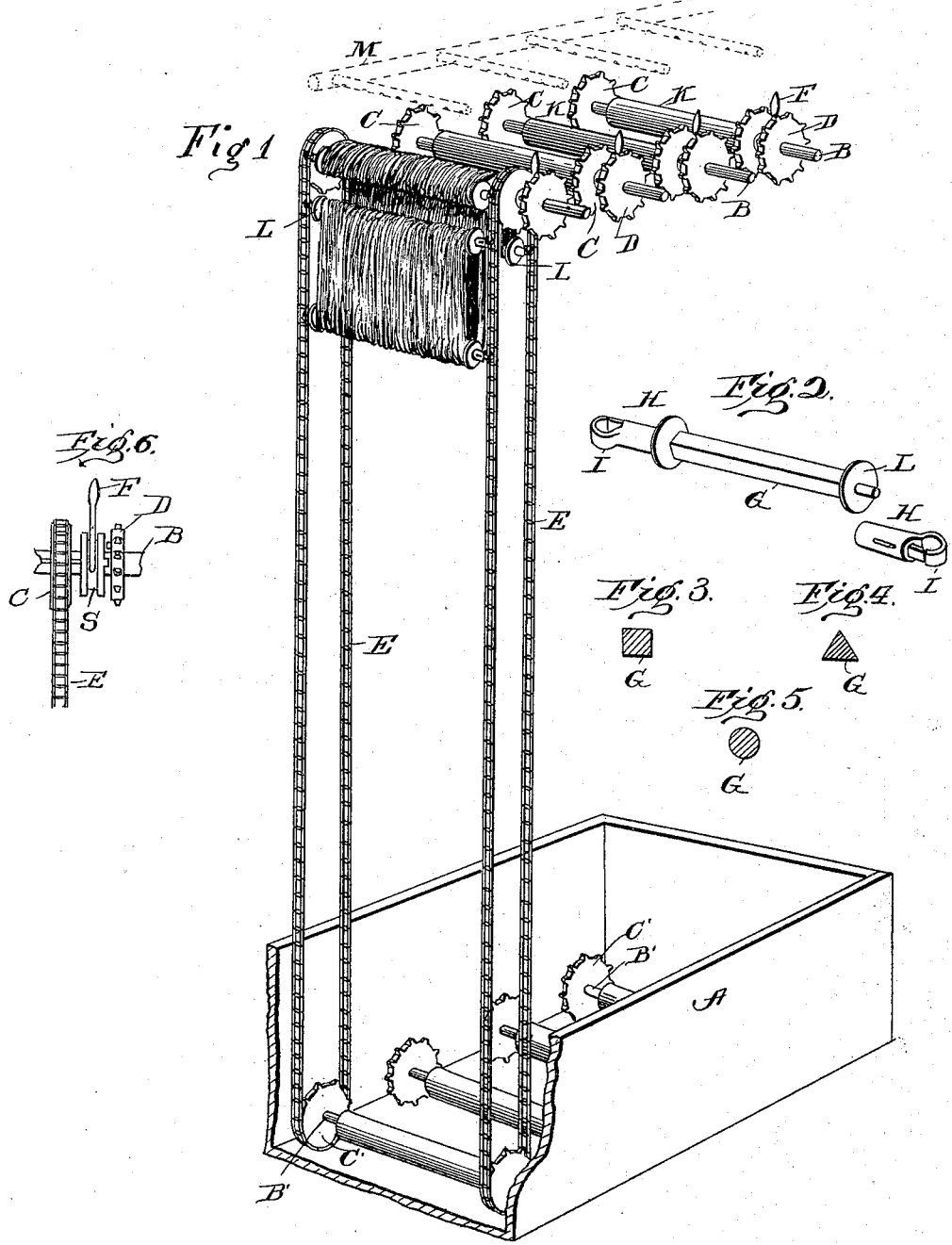

GEORGE W. MOSELY, OF PHILMONT, NEW YORK.

MACHINE FOR DYEING, &c.

SPECIFICATION forming part of Letters Patent No. 639,266, dated December 19, 1899.

Application filed February 24, 1899. Serial No. 706,720. (No model.)

*To all whom it may concern:*

Be it known that I, GEORGE W. MOSELY, a citizen of the United States, residing at Philmont, in the county of Columbia and State of New York, have invented certain new and useful Improvements in Machines for Dyeing, Washing, Bleaching, or Coloring Yarns; and I do hereby declare the following to be a full, clear, and exact description of the same, reference being had to the accompanying drawings, forming part of this specification, and to the letters of reference marked thereon.

This invention relates to improvements in apparatus particularly designed for use in dyeing or coloring yarns in skeins, although it will be obvious that it is equally applicable to handling yarns for washing, bleaching, or other manipulations of a like nature; and the invention has for its object to provide an apparatus of a convenient form in which the operations may be performed more expeditiously and thoroughly than heretofore and with the expenditure of less labor from attendants in handling large quantities of material.

The invention consists in certain novel details of construction and combinations and arrangements of parts, all as will be now described, and the particular features of novelty pointed out in the appended claims.

Referring to the accompanying drawings, Figure 1 is a perspective view with portions broken away and removed to illustrate the underlying construction of an apparatus embodying my present improvements. Fig. 2 is a detail of one of the yarn-sticks with its adjustable bearings. Figs. 3, 4, and 5 are details of yarn-sticks having different shapes in cross-section. Fig. 6 is a detail elevation showing the stop mechanism.

Like letters of reference refer to the same parts.

In the simplest embodiment of my invention, which I have chosen for illustration in the present application, I provide a tank A of convenient dimensions, preferably, however, rectangular and relatively long, in order to permit of the handling of a large quantity of material at one time, and above this tank, at a convenient height, say ten or twelve feet, I arrange shafts B, adapted to be driven from any suitable source of power through the medium of pulleys D or other convenient mechanical appliance. Upon the shafts B are arranged pairs of sprocket-wheels C, over which continuous or endless chains or belts E are adapted to travel and at their lower ends or loops extend into and preferably down to a point near the bottom of the tank A. These pairs of sprocket-chains constitute the carriers for the skeins of yarn, and in order to hold them in alinement at the bottom and insure a steady action they also preferably run around sprocket-wheels C', arranged on shafts B' in the tank, near the bottom. In the preferred arrangement the sprocket-wheels are driven through clutch connections or frictionally, whereby when desired any one or more of the pairs of carrying-chains may be stopped without interrupting the movement of the other chains and without stopping the operation of the whole machine. For this purpose, if desired, clutches S, Fig. 6, having handles F, may connect the shafts and drive-pulleys, and inasmuch as the rotation of the shafts will not be excessively rapid the handles may be operated by the attendant without difficulty, or in case the sprocket-wheels are driven frictionally from the shafts B by grasping the chains of any pair they may be stopped and held as long as desired and when released will continue their travel as before.

The yarn to be handled and subjected to the action of the dyeing, coloring, or bleaching compounds in the tank A is suspended or stretched over yarn-sticks G, Figs. 2 to 5, which sticks G are journaled in bearings H, adapted to be clamped to the carrying-chains of each pair in any suitable manner. In the illustration I have shown a snap-hook arrangement I, which will take over the side bars of the links of the driving-chain and so secure the bearings in place for the reception of the reduced ends of the yarn-sticks G. In the operation of the machine two yarn-sticks are passed through the desired number of skeins or bundles of yarn, so as to lie thereon as though it had been wound on the sticks in the first instance, and then the sticks are secured to the chains by the adjustable bearings H at a sufficient distance apart to extend the yarn to the desired degree. It may be loose or tight, depending on the quantity and quality of material carried by the sticks. A sufficient number of these sections or skeins are mounted on each pair of carrying-chains to substantially occupy the whole length of the chains, and when the machine is started in motion the carrying-chains will cause the yarn to travel down into the tank through the substances contained therein and then again elevate it, allowing the drip from the uppermost skeins to travel down over and through the lower skins, thereby insuring a more perfect penetration of the substances than has heretofore been secured. Inasmuch as the retention of the skeins of yarn in fixed position on the sticks might in some instances tend to cause an uneven distribution of the substances through the yarn, I arrange the shafts B or the shafts B', or both, in such relation to the sprocket wheels and chains that one side of the skeins of yarn carried by the yarn-sticks will draw over said shaft or shafts and the yarn-sticks themselves, turning in the adjustable bearing H, will allow the yarn to change its position on the sticks. In other words, one side of the skeins of yarn is retarded, while the chains tend to carry the opposite side forward, causing it to act like an endless belt or roller, as it were, over the yarn-sticks, whereby that portion that was formerly in the bight at each end of the skeins will be moved along and the whole subjected evenly to the action of the dyestuff or substance. In the preferred construction loose rollers K are mounted on the shafts B between each pair of sprocket-wheels C, and the yarn contacts with this roller rather than with the shaft, although, as will be obvious, this is optional, inasmuch as the object to be attained is the shifting of the yarn on the yarn-sticks, and this may be accomplished through the medium of any retarding-surface with which one side of the yarn contacts. The attendant standing beside the tank can watch the operation to see that it is being perfected and, having the several sections or pairs of carrying-chains under independent control, can stop any one of them either to readjust the skeins at any point or to remove and place new skeins thereon without stopping any of the other sections, and thus the machine may in one sense be said to be continuous in its operation, and, furthermore, it will be noted that with this arrangement there is little or no danger of the yarn winding about the yarn-sticks, as is frequently the case with prior machines for handling this class of material, and even though the end of the yarn should catch and tend to tangle or bundle the yarn on any section it may be instantly detected by the attendant, that pair of chains stopped, and the trouble corrected without difficulty.

The yarn-sticks are preferably angular in cross-section and may be either square, triangular, or round, as illustrated in Figs. 3, 4, and 5, and also in the preferred construction such sticks have disks L at each end for confining the yarn to the center of the sticks and preventing it from catching or tangling around the bearings at the ends of the sticks.

Inasmuch as it is desirable that the smallest possible quantity of liquid or dye substance be employed and the largest possible quantity of yarn subjected to the action of said substance, it will be seen that the arrangement of a series of carrying-chains transversely of the tank with yarn-sticks of a length which will substantially fill the tank widthwise, a very large number of carrying-chains may be arranged in a single tank, as in practice I find that it is only necessary to allow about twelve inches between centers, and thus in a tank twelve feet long and three and a half feet wide twelve sets of carrying-chains may be employed and with three-foot yarn-sticks substantially the whole horizontal area will be utilized, and the quantity of dye material or substance necessarily employed will therefore be relatively small.

Where the machine is used as a washing-machine for yarn and like material, I preferably arrange above the carrying-chains a spray-pipe M, through which clear water may be showered down upon the yarn carried by the chains and the operation of washing thereby facilitated.

The function of the retarding-surface, with which one side of the yarn contacts, to change the position of the yarn with relation to the yarn-sticks, is very important, inasmuch as without such changing the portion of the yarn where it passes over or around the sticks would not be acted upon by the dye substance to the same extent as the other portions of the yarn; but by changing the yarn or causing it to travel around the sticks, so to speak, every portion of it is subjected uniformly to the action of the dye substance, and the result will be a uniform coloring.

Having thus described my invention, what I claim as new, and desire to secure by Letters Patent of the United States, is—

1. In an apparatus such as described, for dyeing, bleaching or handling yarn in skeins, the combination with a tank for containing the substance, to the action of which the yarn is to be subjected, and driving mechanism, of a series of pairs of sprocket-wheels rotated by said driving mechanism, pairs of endless sprocket-chains traveling over said wheels and into the tank with means for supporting the yarn on said chains and stop mechanism interposed between each of the pairs of sprocket-chains and the driving mechanism, whereby any pair of sprocket-chains may be arrested independently of the driving mechanism and other pairs of chains, substantially as described.

2. In an apparatus such as described, the combination with a tank, an overhead shaft, sprocket-wheels carrying sprocket-chains traveling over said wheels and into the tank, and yarn-sticks supported by said chains, of a retarding device lying in the path of the yarn mounted on said sticks and with which said yarn contacts to change the position of the yarn with relation to the sticks; substantially as described.

3. In an apparatus such as described, the combination with a tank, the overhead shaft, a sprocket-wheel, carrying-chains passing over said sprocket-wheels and into the tank, and yarn-sticks mounted on said chains, of a roller on the shaft intermediate the sprocket-wheels with which the yarn on the sticks contacts to retard one side of the yarn and change its position with relation to the sticks; substantially as described.

GEORGE W. MOSELY.

Witnesses:
 A. B. SCOTT,
 CHARLES B. ELLSWORTH.